US010053131B2

(12) United States Patent
Ruggiero et al.

(10) Patent No.: US 10,053,131 B2
(45) Date of Patent: Aug. 21, 2018

(54) BASKET AND STROLLER APPARATUS THEREOF

(71) Applicant: Wonderland Switzerland AG, Steinhausen (CH)

(72) Inventors: Anthony V. Ruggiero, Downingtown, PA (US); Andrew J. Taylor, Mohnton, PA (US); Robert E. Haut, Merion Station, PA (US); Curtis M. Hartenstine, Birdsboro, PA (US)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 15/660,977

(22) Filed: Jul. 27, 2017

(65) Prior Publication Data
US 2018/0029625 A1 Feb. 1, 2018

Related U.S. Application Data

(60) Provisional application No. 62/367,856, filed on Jul. 28, 2016.

(51) Int. Cl.
| B62B 7/12 | (2006.01) |
| B62B 7/06 | (2006.01) |
| B62B 7/10 | (2006.01) |
| B62B 7/00 | (2006.01) |
| B60N 2/28 | (2006.01) |
| A47D 1/06 | (2006.01) |

(52) U.S. Cl.
CPC .................. *B62B 7/12* (2013.01); *A47D 1/06* (2013.01); *B60N 2/2845* (2013.01); *B60N 2/2848* (2013.01); *B62B 7/006* (2013.01); *B62B 7/064* (2013.01); *B62B 7/105* (2013.01)

(58) Field of Classification Search
CPC .......... B62B 7/006; B62B 7/04; B62B 7/044; B62B 7/06; B62B 7/062; B62B 7/064; B62B 7/12; B62B 7/14; B62B 7/142; B62B 7/145

See application file for complete search history.

(56) References Cited

U.S. PATENT DOCUMENTS

| 8,157,273 | B2* | 4/2012 | Bar-Lev | .................... B62B 7/12 280/47.38 |
| 8,807,588 | B2* | 8/2014 | Thomas | .................... B62B 7/14 280/47.4 |
| 9,227,648 | B2* | 1/2016 | Sundberg | .................. B62B 7/12 |

(Continued)

FOREIGN PATENT DOCUMENTS

CN 203402216 1/2014

*Primary Examiner* — Erez Gurari
(74) *Attorney, Agent, or Firm* — Winston Hsu

(57) ABSTRACT

A basket is detachably mounted on a first mount of a carrier for allowing an infant car seat to be mounted on the carrier. The first mount has a first mounting slot. The basket includes a basket body and a mounting structure. The mounting structure is connected to a side of the basket body. The mounting structure has a body portion, an inserting portion and a mounting portion. The body portion is connected between the mounting portion and the inserting portion. The infant car seat is suspended on a storage space of the basket body when the inserting portion is inserted into the first mounting slot and the infant car seat is mounted on the mounting portion.

34 Claims, 9 Drawing Sheets

(56) References Cited

U.S. PATENT DOCUMENTS

| | | | | |
|---|---|---|---|---|
| 2002/0093178 A1* | 7/2002 | Turner | B62B 7/08 | |
| | | | 280/650 | |
| 2005/0264062 A1* | 12/2005 | Longenecker | B60N 2/2806 | |
| | | | 297/250.1 | |
| 2011/0175309 A1* | 7/2011 | Newhard | B62B 9/26 | |
| | | | 280/47.35 | |
| 2012/0261961 A1* | 10/2012 | Heisey | B60N 2/2827 | |
| | | | 297/256.16 | |
| 2014/0061404 A1* | 3/2014 | Xiao | A47D 1/006 | |
| | | | 248/154 | |
| 2014/0159358 A1* | 6/2014 | Chen | B62B 7/145 | |
| | | | 280/769 | |
| 2014/0252737 A1* | 9/2014 | Maxie | A47D 13/025 | |
| | | | 280/47.38 | |
| 2014/0361589 A1* | 12/2014 | Hou | B60N 2/2824 | |
| | | | 297/256.16 | |
| 2015/0042056 A1* | 2/2015 | Sparling | B62B 9/12 | |
| | | | 280/47.35 | |
| 2015/0183450 A1* | 7/2015 | Chen | B62B 7/142 | |
| | | | 280/47.35 | |
| 2015/0329017 A1* | 11/2015 | Kozinski | B60N 2/2848 | |
| | | | 248/188 | |
| 2015/0375766 A1* | 12/2015 | Taylor | B62B 7/142 | |
| | | | 280/647 | |
| 2016/0101802 A1* | 4/2016 | Zhong | B62B 7/142 | |
| | | | 280/47.4 | |
| 2016/0229439 A1* | 8/2016 | Zhong | B62B 7/008 | |
| 2016/0311455 A1* | 10/2016 | Li | B62B 7/08 | |
| 2017/0313339 A1* | 11/2017 | Ruggiero | B62B 7/105 | |
| 2017/0334476 A1* | 11/2017 | Paxton | B62B 7/142 | |
| 2018/0029625 A1* | 2/2018 | Ruggiero | B62B 7/12 | |

\* cited by examiner

BASKET AND STROLLER APPARATUS THEREOF

CROSS REFERENCE TO RELATED APPLICATIONS

This application claims the benefit of U.S. Provisional Application No. 62/367,856, which was filed on Jul. 28, 2016, and is incorporated herein by reference.

BACKGROUND OF THE INVENTION

1. Field of the Invention

The present invention relates to a basket and a stroller apparatus thereof, and more specifically, to a basket detachably mounted on a mount of a carrier for allowing an infant car seat to be mounted on the carrier and a stroller apparatus thereof.

2. Description of the Prior Art

In general, a stroller provides a convenient way to transport an infant seated in its seat. For convenience of a caregiver, the stroller usually has a basket disposed thereon to give the caregiver a place to store and access items, such as diaper bags or coats. However, since a conventional basket is only fixed in a bottom area of the stroller, the caregiver can find it difficult to get items into and out of the basket, so as to greatly limit convenience and installation flexibility of the basket in use.

SUMMARY OF THE INVENTION

The present invention provides a basket detachably mounted on at least one first mount of a carrier for allowing an infant car seat to be mounted on the carrier via the basket. The first mount has a first mounting slot formed thereon. The basket includes a basket body and at least one mounting structure. The basket body has a storage space. The mounting structure is connected to at least one side of the basket body corresponding to the first mount. The mounting structure has a body portion, an inserting portion and a mounting portion. The body portion is connected between the mounting portion and the inserting portion. The infant car seat is suspended on the storage space of the basket body when the inserting portion is inserted into the first mounting slot and the infant car seat is mounted on the mounting portion.

The present invention further provides a stroller apparatus. The stroller apparatus includes an infant car seat, a stroller, and a basket. The stroller has a handle assembly, a main frame assembly, a wheel assembly, and at least one first mount. The main frame assembly is connected between the handle assembly and the wheel frame. The first mount has a first mounting slot formed thereon and is connected to the main frame assembly. The basket is detachably mounted on the first mount of the stroller for allowing the infant car seat to be mounted on the stroller via the basket. The basket includes a basket body and at least one mounting structure. The basket body has a storage space. The mounting structure is connected to at least one side of the basket body corresponding to the first mount. The mounting structure has a body portion, an inserting portion and a mounting portion. The body portion is connected between the inserting portion and the mounting portion. The infant car seat is suspended on the storage space of the basket body when the inserting portion is inserted into the first mounting slot and the infant car seat is mounted on the mounting portion.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
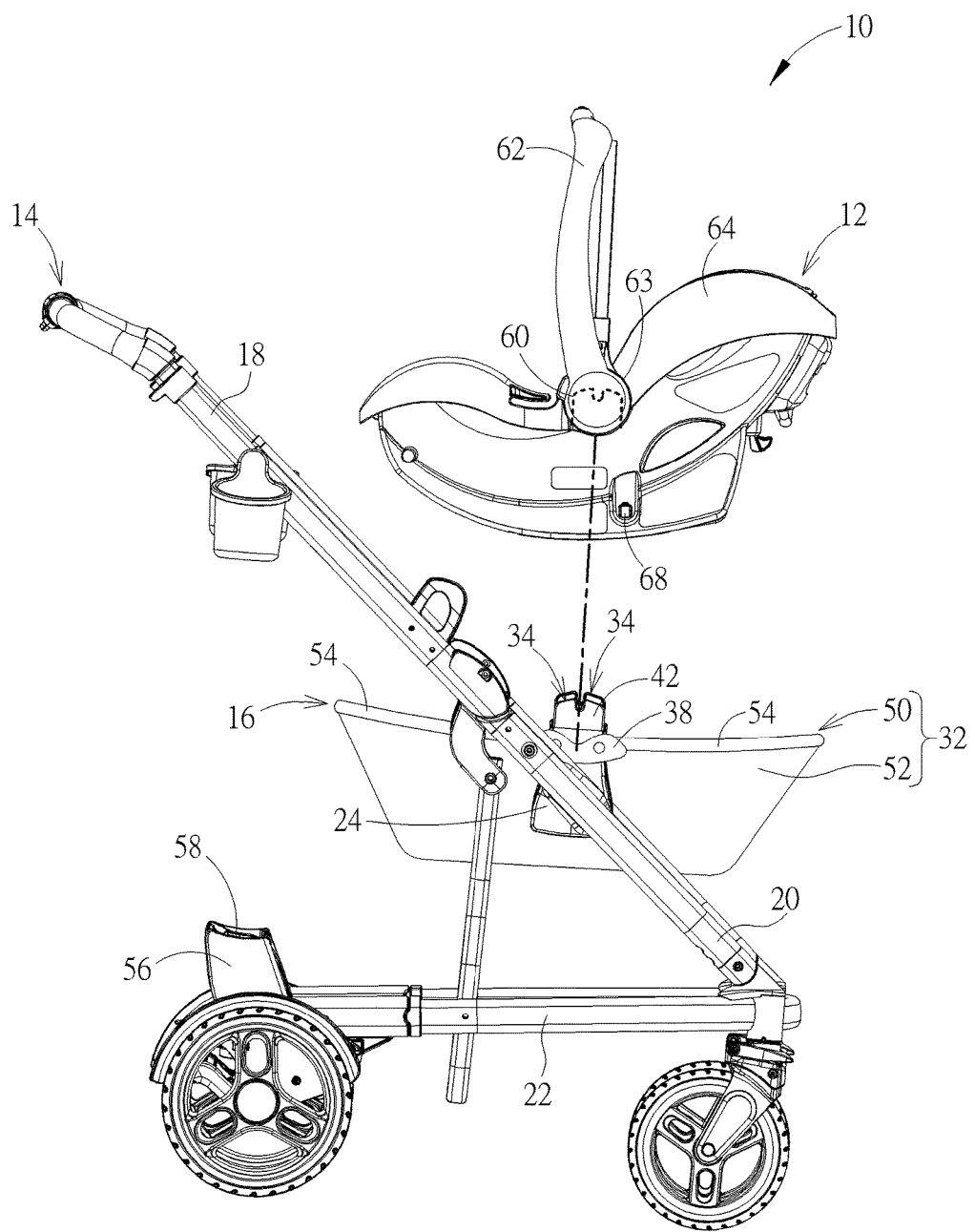
FIG. 1 is a partial exploded diagram of a stroller apparatus according to an embodiment of the present invention.
Figure 2:
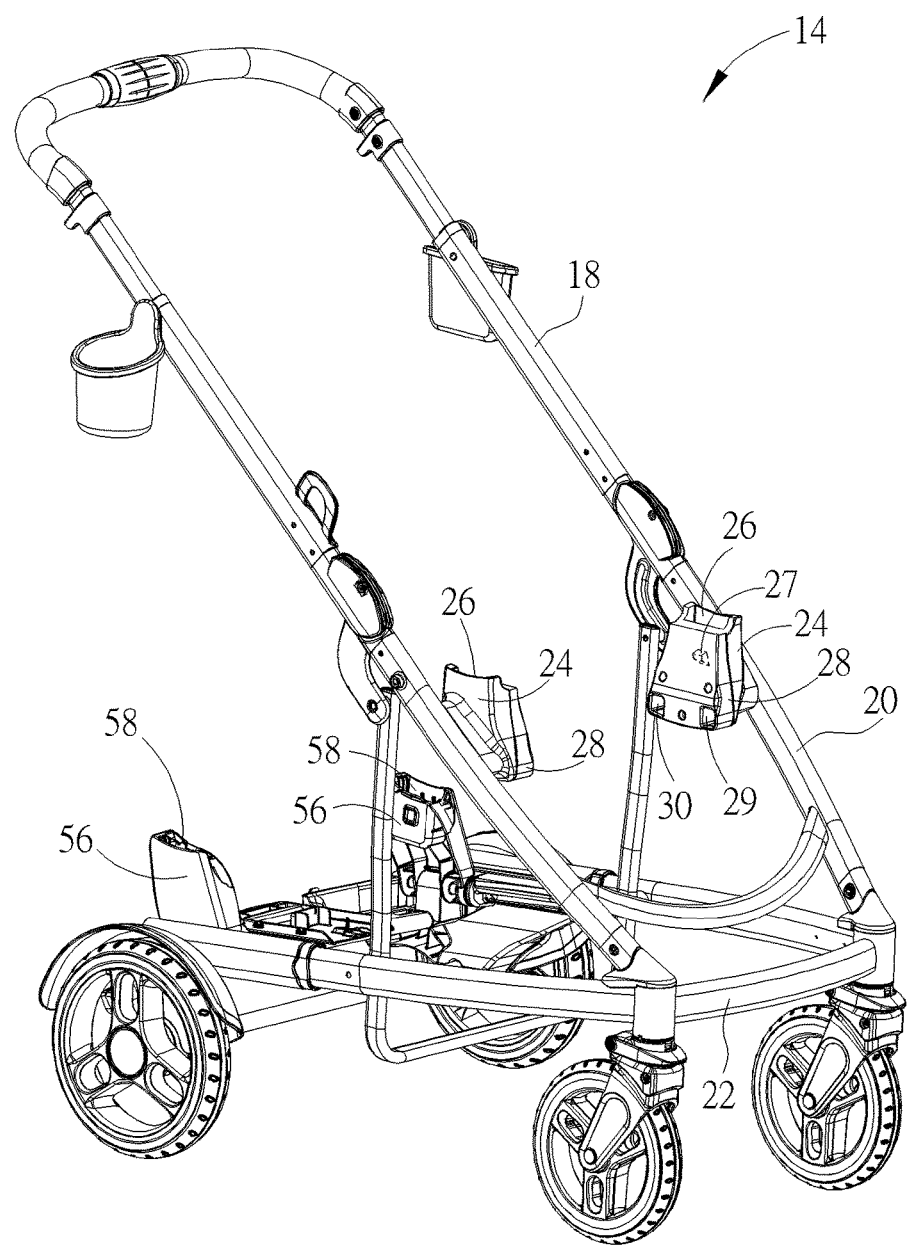
FIG. 2 is a schematic diagram of a stroller in FIG. 1.

Please refer to FIG. 1 and FIG. 2. FIG. 1 is a partial exploded diagram of a stroller apparatus 10 according to an embodiment of the present invention. FIG. 2 is a schematic diagram of a stroller 14 in FIG. 1. As shown in FIG. 1 and FIG. 2, the stroller apparatus 10 includes an infant car seat 12, the stroller 14, and a basket 16. The stroller 14 has a handle assembly 18, a main frame assembly 20, a wheel assembly 22, and two first mounts 24. The main frame assembly 20 is connected between the handle assembly 18 and the wheel assembly 22, such that a user can grip the handle assembly 18 by his two hands to drive the stroller 14 to move forward or backward via the wheel assembly 22. Each first mount 24 has a first mounting slot 26 formed thereon and is connected to the main frame assembly 20. In this embodiment, a supporting structure 28 could preferably be formed at an inner side of each first mount 24 for supporting the infant car seat 12 cooperatively with the basket 16.

Figure 3:
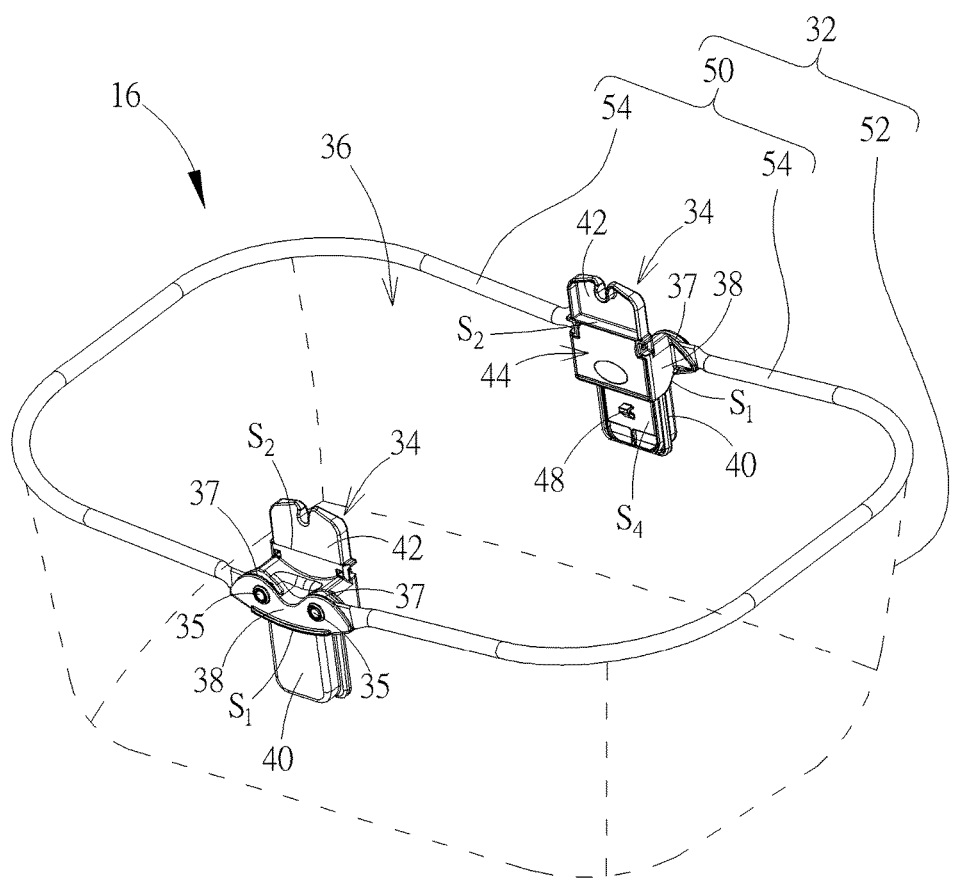
FIG. 3 is a schematic diagram of a basket in FIG. 1.
Figure 4:
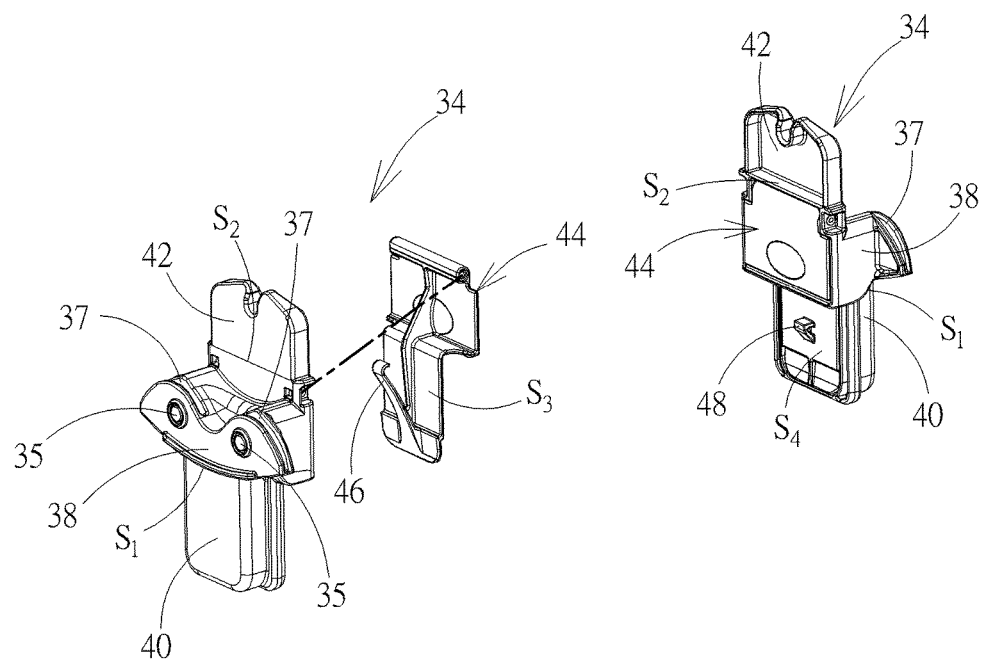
FIG. 4 is a partial exploded diagram of two mounting structures in FIG. 3.

Please further refer to FIG. 3 and FIG. 4. FIG. 3 is a schematic diagram of the basket 16 in FIG. 1. FIG. 4 is a partial exploded diagram of two mounting structures 34 in FIG. 3. As shown in FIG. 1, FIG. 2, FIG. 3, and FIG. 4, the basket 16 is detachably mounted on the two first mounts 24 of the stroller 14 for allowing the infant car seat 12 to be mounted on the stroller 14 via the basket 16. The basket 16 includes a basket body 32 and the two mounting structures 34. The basket body 32 has a storage space 36 for a user to place an infant or store and access items (e.g. diaper bags or coats), and the two mounting structures 34 are connected to two sides of the basket body 32 respectively. To be more specific, each mounting structure 34 could have a body portion 38, an inserting portion 40 and a mounting portion 42. The body portion 38 is connected between the inserting portion 40 and the mounting portion 42. In this embodiment, the inserting portion 40 extends downward from a bottom side $S_1$ of the body portion 38, and the mounting portion 42 extends upward from a top side $S_2$ of the body portion 38.

Accordingly, the infant car seat 12 can be suspended on the storage space 36 when the two inserting portions 40 are inserted into the first mounting slots 26 respectively and the infant car seat 12 is mounted on the two mounting portions 42.

Furthermore, for ensuring that the mounting structure 34 could be assembled with the first mount 24 more steadily, as shown in FIG. 2, FIG. 3 and FIG. 4, each mounting structure 34 could further have a latch portion 44. The latch portion 44 is pivotally hinged to the body portion 38 and has an elastic arm 46 and a fixing hook 48, and the first mounting slot 26 has a fixing hole 27 (briefly depicted by dotted lines in FIG. 2) formed therein corresponding to the fixing hook 48. The elastic arm 46 bends from a first surface $S_3$ of the latch portion 44 to abut against the inserting portion 40, and the fixing hook 48 protrudes from a second surface $S_4$ (opposite to the first surface $S_3$) of the latch portion 44. Accordingly, the elastic arm 46 could provide an elastic force to drive the fixing hook 48 to be engaged with the fixing hole 27 of the first mounting slot 26 when the inserting portion 40 and the latch portion 44 are inserted into the first mounting slot 26, so as to fix the latch portion 44 and the inserting portion 40 in the first mounting slot 26 securely. On the other hand, when the user wants to release engagement between the fixing hook 48 and the first mounting slot 26, the user just needs to press the latch portion 44 inwardly toward the inserting portion 40 to disengage the fixing hook 48 from the fixing hole 27, so that the user could pull the latch portion 44 and the inserting portion 40 out of the first mounting slot 26 easily for lifting the basket 16 from the stroller 14.

Figure 5:
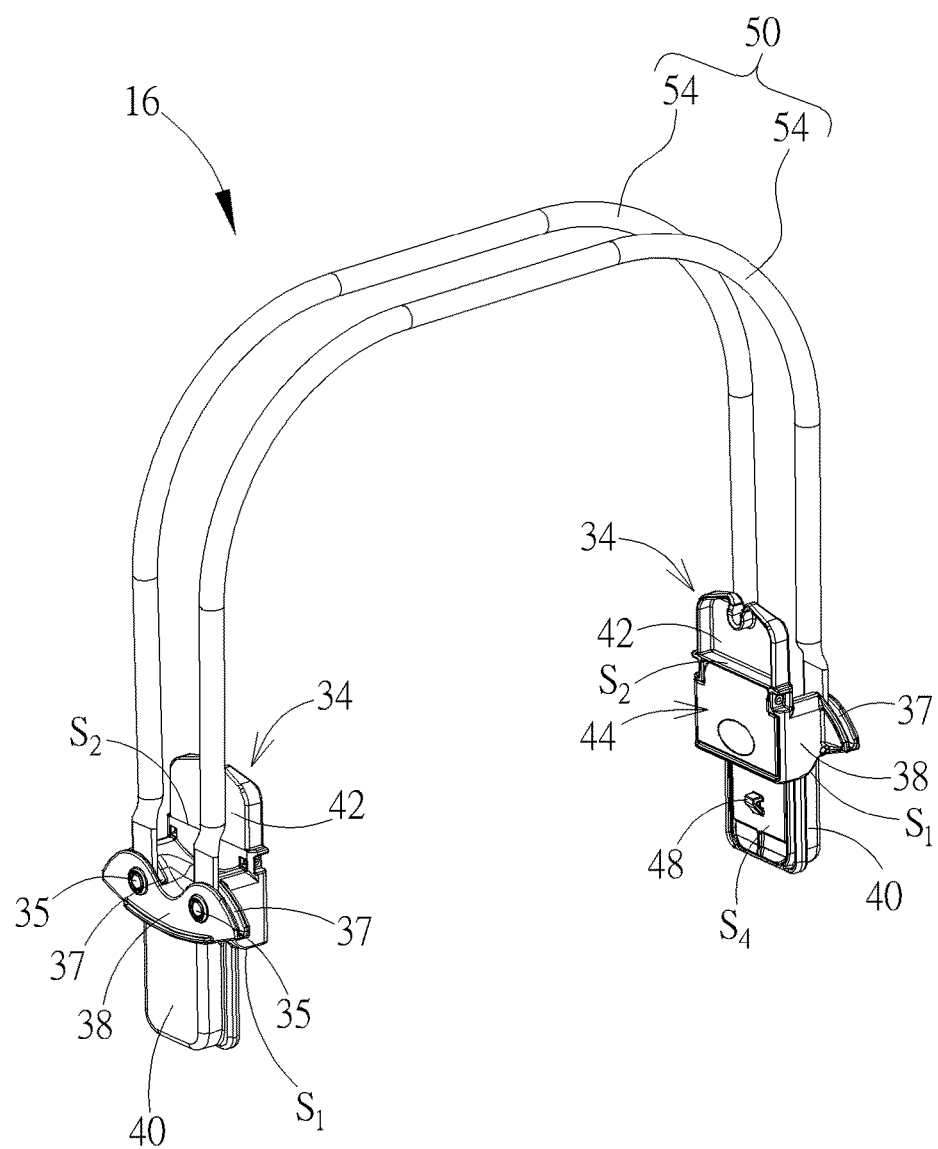
FIG. 5 is a schematic diagram of the basket in FIG. 3 in a folded state.
Figure 6:
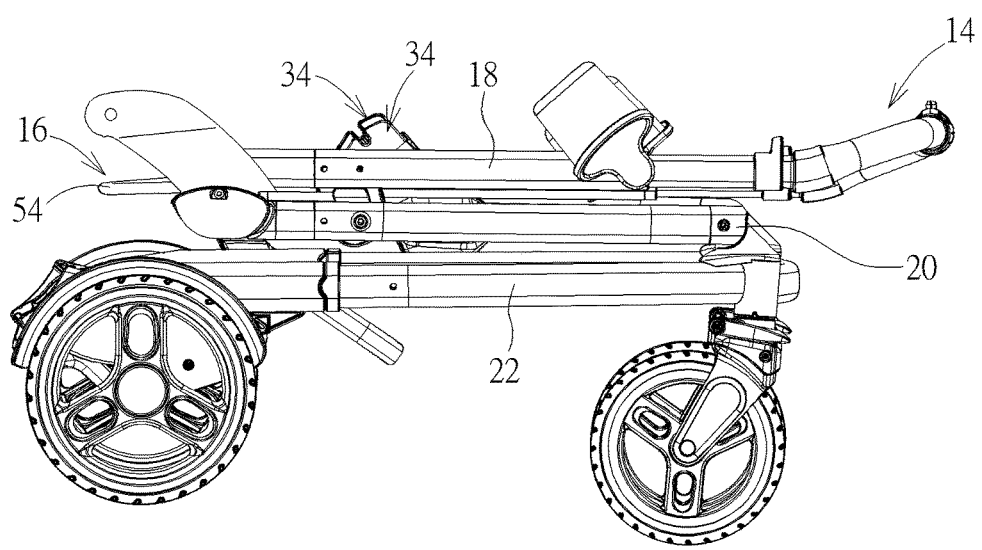
FIG. 6 is a side view of the basket in FIG. 5 being folded with the stroller.

In practical application, the basket body 32 could preferably be foldable with the stroller 14. For example, please refer to FIG. 3, FIG. 5, and FIG. 6. FIG. 5 is a schematic diagram of the basket 16 in FIG. 3 in a folded state. FIG. 6 is a side view of the basket 16 in FIG. 5 being folded with the stroller 14. As shown in FIG. 3, FIG. 5, and FIG. 6, the basket body 32 could include a tube structure 50 and a basket fabric 52 (the basket fabric 52 is briefly depicted by dotted lines in FIG. 3 for clearly showing the structural design of the mounting structure 34 and is omitted in FIG. 5 for simplicity). The basket fabric 52 is attached under the tube structure 50 for forming the storage space 36, and the two mounting structures 34 are connected to two sides of the tube structure 50 respectively. In this embodiment, the tube structure 50 could include two bent tubes 54 (preferably U-shaped, but not limited thereto), and two ends of each bent tube 54 are pivoted to the two body portions 38 respectively (e.g. the mounting structure 34 could preferably utilize a pivot pin 35 to pivotally connect an end of the bent tube 54 to an elongated slot 37 on the body portion 38 as shown in FIG. 3, but not limited thereto). In such a manner, the two bent tubes 54 could be upwardly foldable with the basket fabric 52, so as to make the basket 16 foldable with the stroller 14 (as shown in FIG. 6) for convenient storage.

Figure 7:
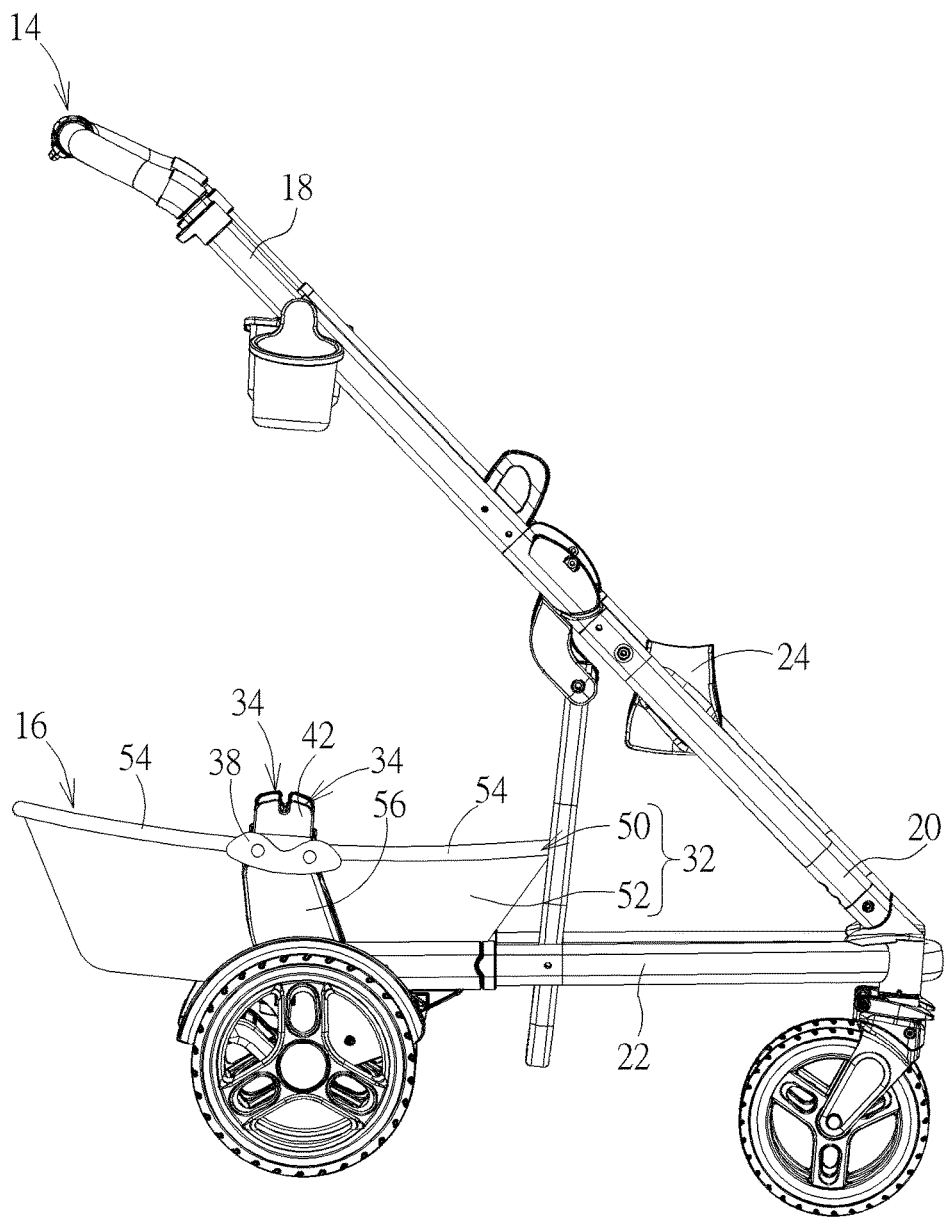
FIG. 7 is a side view of the basket in FIG. 1 being mounted at another different position of the stroller.

Furthermore, disposal of the basket 16 is not limited to the position as shown in FIG. 1. For example, please refer to FIG. 1, FIG. 2, and FIG. 7. FIG. 7 is a side view of the basket 16 in FIG. 1 being mounted at another different position of the stroller 14. As shown in FIG. 1, FIG. 2, and FIG. 7, the stroller 14 could further have two second mounts 56 corresponding to the two first mounts 24 respectively. Each second mount 56 could have a second mounting slot 58 formed thereon and preferably be located at a rearward position of the wheel assembly 22 (but not limited thereto, meaning that the present invention could adopt the design that the two second mounts 56 are located at other different positions from the two first mounts 24, such as a forward or central position of the wheel assembly 22). Accordingly, the basket 16 could be selectively disposed at the position of the stroller 14 as shown in FIG. 7 by inserting the inserting portion 40 of the mounting structure 34 into the second mounting slot 58 of the second mounts 56 for the user to get items into and out of the basket 16 conveniently, so as to improve the installation flexibility of the basket 16 in use. To be noted, the structural design of the carrier on which the basket 16 could be mounted is not limited to the aforesaid stroller 14. That is to say, the basket 16 could be mounted on any other type of carrier having at least one first mount for baby care, such as a foldable X-shaped frame, and the related description for the design for mounting the basket on the aforesaid carrier could be reasoned by analogy according to this embodiment and omitted herein.

Figure 8:
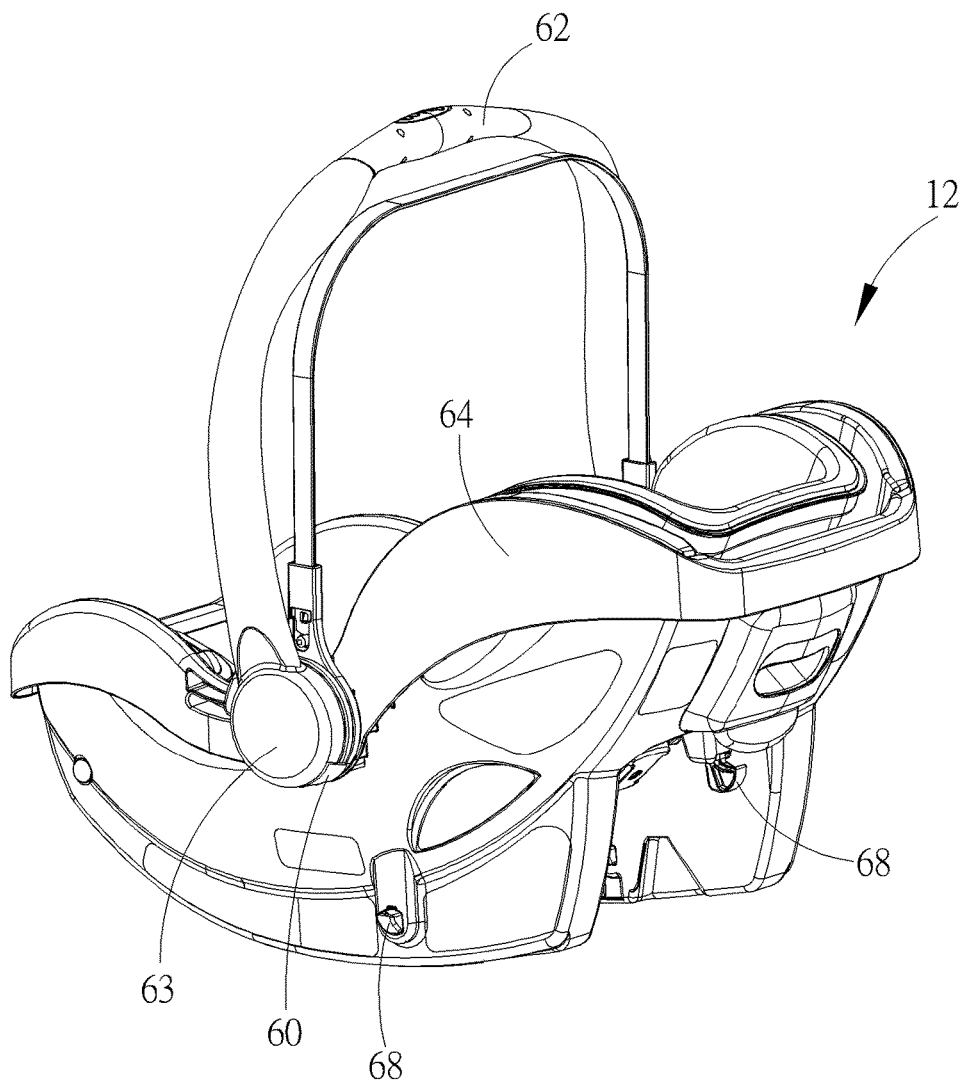
FIG. 8 is a schematic diagram of an infant car seat in FIG. 1.

As for the mounting design of the infant car seat 12, the related description is provided as follows. Please refer to FIG. 2 and FIG. 8. FIG. 8 is a schematic diagram of the infant car seat 12 in FIG. 1. As shown in FIG. 2 and FIG. 8, the infant car seat 12 has two engaging slots 60 (briefly depicted by dotted lines in FIG. 2) corresponding to the two mounting portions 42 respectively (e.g. the shape of the engaging slot 60 could be matched with the shape of the mounting portion 42 for securely mounting the infant car seat 12 on the mounting structure 34). To be more specific, in this embodiment, the infant car seat 12 could include a handle 62 and a seat body 64, and two ends of the handle 62 could have two connection bases 63 connected to two sides of the seat body 64 respectively. The two engaging slots 60 are formed on the two connection bases 63 for receiving the two mounting portions 42 respectively. Moreover, in this embodiment, each supporting structure 28 could have an engaging groove 29, and the infant car seat 12 could further have two protruding blocks 68 formed at two sides of the infant car seat 12 corresponding to the two engaging grooves 29 respectively. Accordingly, the infant car seat 12 could be positioned at the rearward facing position as shown in FIG. 2 on the two mounting structures 34 steadily when the two engaging slots 60 receive the two mounting portions 42 respectively and each protruding block 68 is engaged with the corresponding engaging groove 29. In practical application, for installation flexibility, as shown in FIG. 2 and FIG. 8, each supporting structure 28 could further have an engaging groove 30 adjacent to the engaging groove 29. In such a manner, the infant car seat 12 could be turned 180° and be positioned at the forward facing position on the two mounting structures 34 steadily when the two engaging slots 60 receive the two mounting portions 42 respectively and each protruding block 68 is engaged with the corresponding engaging groove 30.

Via the aforesaid designs, when the user wants to mount the infant car seat 12 on the stroller 14 via the basket 16, the user just needs to mount the basket 16 on the two first mounts 24 of the stroller 14 by inserting the two inserting portions 40 into the two first mounting slots 26 of the two first mounts 24 respectively, and then mounts the infant car seat 12 on the two mounting structures 34 by utilizing the engaging slots 60 to receive the two mounting portions 42 respectively. After the basket 16 and the infant car seat 12 are mounted on the stroller 14 sequentially, as mentioned above, the two engaging slots 60 can receive the two mounting portions 42 respectively to support the infant car seat 12 and the two protruding blocks 68 can be engaged with the two engaging grooves 29 to position the infant car seat 12 at the rearward facing position, so as to make the infant car seat 12 suspended on the storage space 36 more steadily. In such a manner, the user can place an infant in the infant car seat 12 and can get items into and out of the basket 16 conveniently and smoothly, so as to greatly improve convenience of the basket 16 in use. Moreover, since the basket 16 can contain rear straps of the infant car seat 12 in the storage space 36 after the infant car seat 12 is mounted on the stroller 14 via the basket 16, the present invention can surely prevent an infant in the infant car seat 12 from being entangled in the rear straps, so as to enhance safety of the stroller apparatus 10 in use.

Figure 9:
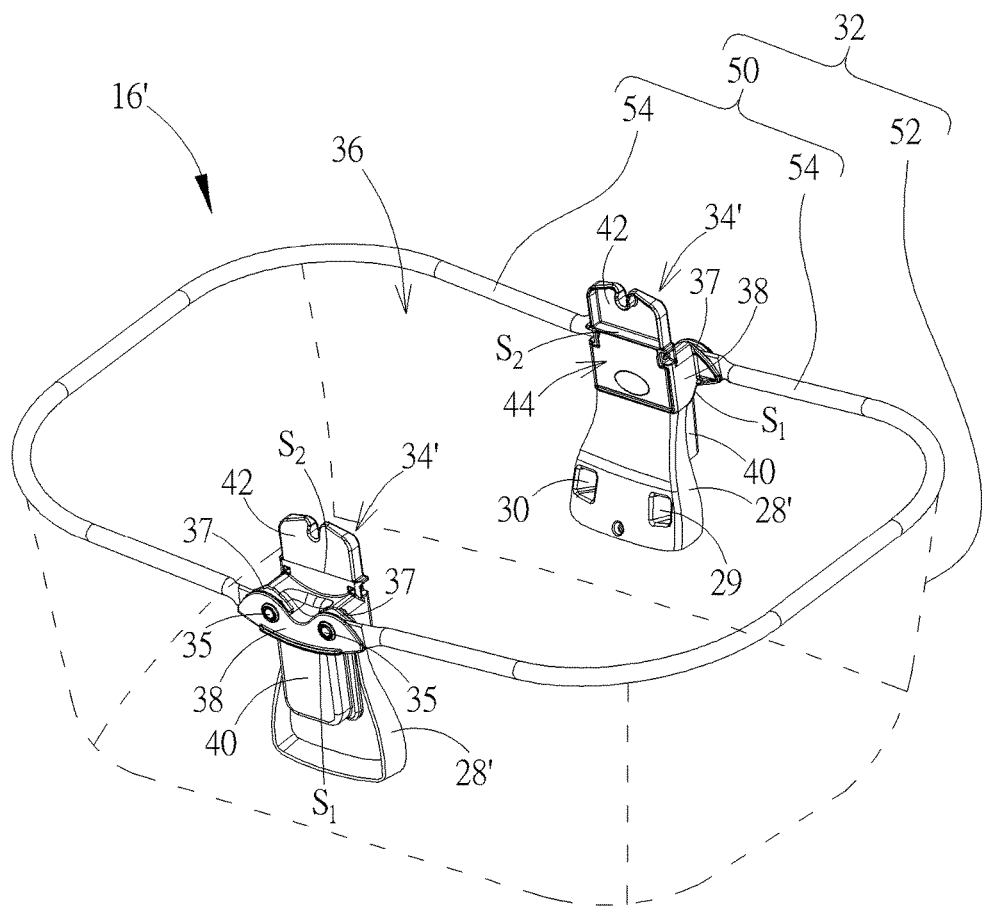
FIG. 9 is a schematic diagram of a basket according to another embodiment of the present invention.

It should be mentioned that the forming position of the supporting structure is not limited to the aforesaid embodiment, meaning that the present invention could adopt the design that the supporting structure is formed integrally with the mounting structure of the basket in another embodiment. For example, please refer to FIG. 9, which is a schematic diagram of a basket 16' according to another embodiment of the present invention. Components both mentioned in this embodiment and the aforesaid embodiment represent components with similar structures or functions, and the related description is omitted herein. For clearly showing the structural design of two mounting structure 34', the basket fabric 52 is briefly depicted by dotted lines in FIG. 9. As shown in FIG. 9, the basket 16' could include the basket body 32 and the two mounting structures 34'. Each mounting structure 34' could have the body portion 38, the inserting portion 40, the mounting portion 42, and a supporting structure 28'. Each supporting structure 28' could extend downward from the bottom side $S_1$ of the body portion 38 to be adjacent to an inner side of the corresponding inserting portion 40. To be noted, in this embodiment, the structural shape of the first mounting slot 26 could be matched with the structural shape of the supporting structure 28' for completely containing the inserting portion 40 when the inserting portions 40 is inserted into the first mounting slot 26. Accordingly, when the two inserting portions 40 are inserted into the first mounting slots 26 respectively and the infant car seat 12 is mounted on the two mounting portions 42, the two supporting structures 28' can position the infant car seat 12, so as to make the infant car seat 12 suspended on the storage space 36 of the basket 16' more steadily. As for the related description for the other structural designs of the basket 16' (e.g. the folding design, the design that the basket could be mounted on a carrier, the infant car seat positioning design, etc.), it could be reasoned by analogy according to the aforesaid embodiment and omitted herein.

To be noted, in another embodiment, the present invention could adopt the design that the basket has only one mounting structure to be detachably mounted on only one first mount of the stroller for allowing the infant car seat to be mounted on the stroller via the basket, so as to simplify the structural design of the stroller apparatus. As for the related description for the structural designs of this embodiment (e.g. the design for supporting the infant car seat on the basket, the design for mounting the basket on the stroller, etc.), it could be reasoned by analogy according to the aforesaid embodiments and omitted herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A basket detachably mounted on at least one first mount of a carrier for allowing an infant car seat to be mounted on the carrier via the basket, the first mount having a first mounting slot formed thereon, the basket comprising:
   a basket body having a storage space; and
   at least one mounting structure connected to at least one side of the basket body corresponding to the first mount, the mounting structure having a body portion, an inserting portion and a mounting portion, the body portion being connected between the mounting portion and the inserting portion, the infant car seat being suspended on the storage space of the basket body when the inserting portion is inserted into the first mounting slot and the infant car seat is mounted on the mounting portion.

2. The basket of claim 1, wherein the mounting portion extends upward from a top side of the body portion, and the inserting portion extends downward from a bottom side of the body portion.

3. The basket of claim 2, wherein the mounting structure further has a supporting structure, and the supporting structure extends downward from the bottom side of the body portion to be adjacent to an inner side of the inserting portion for supporting the infant car seat cooperatively with the mounting structure to be suspended on the storage space of the basket body when the inserting portion is inserted into the first mounting slot and the infant car seat is mounted on the mounting portion.

4. The basket of claim 3, wherein the supporting structure has at least one engaging groove formed thereon, the infant car seat has a protruding block formed at a side of the infant car seat corresponding to the engaging groove, and when the infant car seat is mounted on the mounting portion, the protruding block is engaged with the engaging groove for positioning the infant car seat.

5. The basket of claim 4, wherein the supporting structure has two engaging grooves formed thereon; when the infant car seat is mounted on the mounting portion and the protruding block is engaged with one of the two engaging grooves, the infant car seat is positioned at a rearward facing position; when the infant car seat is mounted on the mounting portion and the protruding block is engaged with the other one of the two engaging grooves, the infant car seat is positioned at a forward facing position.

6. The basket of claim 1, wherein a supporting structure is formed on an inner side of the first mount for supporting the infant car seat cooperatively with the mounting structure to be suspended on the storage space of the basket body when the inserting portion is inserted into the first mounting slot and the infant car seat is mounted on the mounting portion.

7. The basket of claim 6, wherein the supporting structure has at least one engaging groove formed thereon, the infant car seat has a protruding block formed at a side of the infant car seat corresponding to the engaging groove, and when the infant car seat is mounted on the mounting portion, the protruding block is engaged with the engaging groove for positioning the infant car seat.

8. The basket of claim 7, wherein the supporting structure has two engaging grooves formed thereon; when the infant car seat is mounted on the mounting portion and the protruding block is engaged with one of the two engaging grooves, the infant car seat is positioned at a rearward facing position; when the infant car seat is mounted on the mounting portion and the protruding block is engaged with the other one of the two engaging grooves, the infant car seat is positioned at a forward facing position.

9. The basket of claim 1, wherein the mounting structure further has a latch portion, the latch portion is pivotally hinged to the body portion and has an elastic arm and a fixing hook, the elastic arm bends from a first surface of the latch portion to abut against the inserting portion, the fixing hook protrudes from a second surface of the latch portion opposite to the first surface, and the elastic arm provides an elastic force to drive the fixing hook to be engaged with the first mounting slot when the inserting portion and the latch portion are inserted into the first mounting slot, so as to fix the latch portion and the inserting portion in the first mounting slot.

10. The basket of claim 1, wherein the carrier comprises two first mounts, the basket comprises two mounting structures, each first mount has the first mounting slot formed thereon, each mounting structure has the body portion, the inserting portion and the mounting portion, and the infant car seat is suspended on the storage space of the basket body when the two inserting portions are inserted into the two first mounting slots respectively and the infant car seat is mounted on the two mounting portions.

11. The basket of claim 10, wherein the basket body comprises:
a tube structure; and
a basket fabric attached under the tube structure for forming the storage space, the two mounting structures being connected to two sides of the tube structure respectively.

12. The basket of claim 11, wherein the tube structure comprises two bent tubes, and two ends of each bent tube are pivoted to the two body portions respectively to be upwardly foldable with the basket fabric, so as to make the basket foldable with the carrier.

13. The basket of claim 1, wherein the carrier further has at least one second mount corresponding to the first mount and located at a different position from the first mount, the second mount has a second mounting slot formed thereon, and the basket is mounted on the carrier via the second mount when the inserting portion is inserted into the second mounting slot.

14. The basket of claim 1, wherein the carrier is a stroller, the stroller has a handle assembly, a main frame assembly, and a wheel assembly, the main frame assembly is connected between the handle assembly and the wheel assembly, and the first mount is connected to the main frame assembly.

15. The basket of claim 14, wherein the stroller further has at least one second mount corresponding to the first mount and located at a different position from the first mount, the second mount has a second mounting slot formed thereon, and the basket is mounted on the stroller via the second mount when the inserting portion is inserted into the second mounting slot.

16. The basket of claim 15, wherein the second mount is located on the wheel assembly.

17. The basket of claim 1, wherein the infant car seat has at least one engaging slot corresponding to the mounting portion, and the infant car seat is mounted on the mounting structure when the engaging slot receives the mounting portion.

18. The basket of claim 17, wherein the infant car seat comprises a handle and a seat body, at least one end of the handle has a connection base connected to a side of the seat body, the engaging slot is formed on the connection base, and the infant car seat is mounted on the mounting structure when the engaging slot receives the mounting portion.

19. A stroller apparatus comprising:
an infant car seat;
a stroller having a handle assembly, a main frame assembly, a wheel assembly, and at least one first mount, the main frame assembly being connected between the handle assembly and the wheel frame, the first mount having a first mounting slot formed thereon and being connected to the main frame assembly; and
a basket detachably mounted on the first mount of the stroller for allowing the infant car seat to be mounted on the stroller via the basket, the basket comprising:
a basket body having a storage space; and
at least one mounting structure connected to at least one side of the basket body corresponding to the first mount, the mounting structure having a body portion, an inserting portion and a mounting portion, the body portion being connected between the inserting portion and the mounting portion, the infant car seat being suspended on the storage space of the basket body when the inserting portion is inserted into the first mounting slot and the infant car seat is mounted on the mounting portion.

20. The stroller apparatus of claim 19, wherein the mounting portion extends upward from a top side of the body portion, and the inserting portion extends downward from a bottom side of the body portion.

21. The stroller apparatus of claim 20, wherein the mounting structure further has a supporting structure, and the supporting structure extends downward from the bottom side of the body portion to be adjacent to an inner side of the inserting portion for supporting the infant car seat cooperatively with the mounting structure to be suspended on the storage space of the basket body when the inserting portion is inserted into the first mounting slot and the infant car seat is mounted on the mounting portion.

22. The stroller apparatus of claim 21, wherein the supporting structure has at least one engaging groove formed thereon, the infant car seat has a protruding block formed at a side of the infant car seat corresponding to the engaging groove, and when the infant car seat is mounted on the mounting portion, the protruding block is engaged with the engaging groove for positioning the infant car seat.

23. The stroller apparatus of claim 22, wherein the supporting structure has two engaging grooves formed thereon; when the infant car seat is mounted on the mounting portion and the protruding block is engaged with one of the two engaging grooves, the infant car seat is positioned at a rearward facing position; when the infant car seat is mounted on the mounting portion and the protruding block is engaged with the other one of the two engaging grooves, the infant car seat is positioned at a forward facing position.

24. The stroller apparatus of claim 19, wherein a supporting structure is formed on an inner side of the first mount for supporting the infant car seat cooperatively with the mounting structure to be suspended on the storage space of the basket body when the inserting portion is inserted into the first mounting slot and the infant car seat is mounted on the mounting portion.

25. The stroller apparatus of claim 24, wherein the supporting structure has at least one engaging groove formed thereon, the infant car seat has a protruding block formed at a side of the infant car seat corresponding to the engaging groove, and when the infant car seat is mounted on the mounting portion, the protruding block is engaged with the engaging groove for positioning the infant car seat.

26. The stroller apparatus of claim 25, wherein the supporting structure has two engaging grooves formed thereon; when the infant car seat is mounted on the mounting portion and the protruding block is engaged with one of the two engaging grooves, the infant car seat is positioned at a rearward facing position; when the infant car seat is mounted on the mounting portion and the protruding block is engaged with the other one of the two engaging grooves, the infant car seat is positioned at a forward facing position.

27. The stroller apparatus of claim 19, wherein the mounting structure further has a latch portion, the latch portion is pivotally hinged to the body portion and has an elastic arm and a fixing hook, the elastic arm bends from a first surface of the latch portion to abut against the inserting portion, the fixing hook protrudes from a second surface of the latch portion opposite to the first surface, and the elastic arm provides an elastic force to drive the fixing hook to be engaged with the first mounting slot when the inserting portion and the latch portion are inserted into the first mounting slot, so as to fix the latch portion and the inserting portion in the first mounting slot.

28. The stroller apparatus of claim 19, wherein the stroller comprises two first mounts, the basket comprises two mounting structures, each first mount has the first mounting slot formed thereon, each mounting structure has the body portion, the inserting portion and the mounting portion, and the infant car seat is suspended on the storage space of the basket body when the two inserting portions are inserted into the two first mounting slots respectively and the infant car seat is mounted on the two mounting portions.

29. The stroller apparatus of claim 28, wherein the basket body comprises:
 a tube structure; and
 a basket fabric attached under the tube structure for forming the storage space, the two mounting structures being connected to two sides of the tube structure respectively.

30. The stroller apparatus of claim 29, wherein the tube structure comprises two bent tubes, and two ends of each bent tube are pivoted to the two body portions respectively to be upwardly foldable with the basket fabric, so as to make the basket foldable with the stroller.

31. The stroller apparatus of claim 19, wherein the stroller further has at least one second mount corresponding to the first mount and located at different positions from the first mount, the second mount has a second mounting slot formed thereon, and the basket is mounted on the stroller via the second mount when the inserting portion is inserted into the second mounting slot.

32. The stroller apparatus of claim 31, wherein the second mount is located on the wheel assembly.

33. The stroller apparatus of claim 19, wherein the infant car seat has at least one engaging slot corresponding to the mounting portion, and the infant car seat is mounted on the mounting structure when the engaging slot receives the mounting portion.

34. The stroller apparatus of claim 33, wherein the infant car seat comprises a handle and a seat body, at least one end of the handle has a connection base connected to a side of the seat body, the engaging slot is formed on the connection base, and the infant car seat is mounted on the mounting structure when the engaging slot receives the mounting portion.

\* \* \* \* \*